US009292712B2

(12) United States Patent
Ståhl et al.

(10) Patent No.: US 9,292,712 B2
(45) Date of Patent: Mar. 22, 2016

(54) METHOD AND APPARATUS FOR MAINTAINING SECURE TIME

(71) Applicant: ST-Ericsson SA, Plan-les-Ouates (CH)

(72) Inventors: Per Ståhl, Klagshamn (SE); Håkan Englund, Lund (SE); Martin Hovang, Bjarred (SE); Hervé Sibert, Le Mans (FR)

(73) Assignee: ST-Ericsson SA, Plan-les-Quates (CH)

( * ) Notice: Subject to any disclaimer, the term of this patent is extended or adjusted under 35 U.S.C. 154(b) by 473 days.

(21) Appl. No.: 13/630,222

(22) Filed: Sep. 28, 2012

(65) Prior Publication Data

US 2014/0095918 A1  Apr. 3, 2014

(51) Int. Cl.
G06F 1/00  (2006.01)
*G06F 21/72*  (2013.01)
G06F 1/14  (2006.01)
*G06F 21/74*  (2013.01)

(52) U.S. Cl.
CPC .............. *G06F 21/725* (2013.01); *G06F 1/14* (2013.01); *G06F 21/74* (2013.01)

(58) Field of Classification Search
CPC ............ G06F 1/08; G06F 1/10; G06F 21/74; G06F 21/725; G06F 1/14
See application file for complete search history.

(56) References Cited

U.S. PATENT DOCUMENTS

| 5,826,066 | A | 10/1998 | Jardine et al. | |
|---|---|---|---|---|
| 6,728,880 | B1 | 4/2004 | Sites | |
| 7,146,504 | B2 | 12/2006 | Parks et al. | |
| 8,239,961 | B2 * | 8/2012 | Strohwig ................ | G06F 21/10 705/901 |
| 2003/0233553 | A1 | 12/2003 | Parks et al. | |
| 2004/0128528 | A1 * | 7/2004 | Poisner ..................... | G06F 1/14 713/322 |
| 2004/0205368 | A1 * | 10/2004 | Lange-Pearson et al. .... | 713/400 |
| 2006/0156417 | A1 * | 7/2006 | Choi ................................ | 726/27 |
| 2006/0265623 | A1 * | 11/2006 | Dinescu ......................... | 713/600 |
| 2006/0294593 | A1 | 12/2006 | Eldar et al. | |
| 2007/0220297 | A1 | 9/2007 | Orlando et al. | |
| 2008/0077420 | A1 * | 3/2008 | Cromer .................... | G06F 21/10 705/307 |
| 2008/0276298 | A1 * | 11/2008 | Leterrier et al. .................. | 726/2 |
| 2010/0011214 | A1 * | 1/2010 | Cha et al. ....................... | 713/175 |

FOREIGN PATENT DOCUMENTS

EP  1914968 A2  8/2007

OTHER PUBLICATIONS

Globalplatform Device Technology, "TEE Client API Specification," Jul. 2010, Public Release, Version 1.0.
Globalplatform Device Technology, "TEE Internal API Specification," Dec. 2011, Public Release, Version 1.0.
Globalplatform Device Technology, "TEE System Architecture," Dec. 2011, Public Release, Version 1.0.

* cited by examiner

*Primary Examiner* — Mohammed Rehman
*Assistant Examiner* — Gayathri Sampath
(74) *Attorney, Agent, or Firm* — Coats & Bennett, P.L.L.C.

(57) ABSTRACT

An exemplary method of maintaining secure time in a computing device is disclosed in which one or more processors implements a Rich Execution Environment (REE), and a separate Trusted Execution Environment (TEE). The TEE maintains a real-time clock (RTC) that provides a RTC time to the REE. A RTC offset is stored in non-volatile memory, with the RTC offset indicating a difference between the RTC time and a protected reference (PR) time. Responsive to a request from the REE to read the RTC time, a current RTC time is returned to the REE. Responsive to a request from the REE to adjust the RTC time, the RTC time and the corresponding RTC offset are adjusted by a same amount, such that the PR time is not altered by the RTC adjustment. An exemplary computing device operable to implement the method is also disclosed.

24 Claims, 10 Drawing Sheets

METHOD AND APPARATUS FOR MAINTAINING SECURE TIME

TECHNICAL FIELD

The present invention generally relates to secure time, and more particularly relates to a method and apparatus for maintaining secure time in a computing device in which one or more processors implements a Rich Execution Environment (REE), and a separate Trusted Execution Environment (TEE).

BACKGROUND

A trusted execution environment (TEE) is an environment where sensitive code can be executed in isolation from a so-called "rich OS" (e.g., Linux, Windows). In some ARM-based mobile devices, a TEE is realized based on the ARM TRUSTZONE technology, which is a hardware-based technology that allows security sensitive code to be executed in isolation from other less security sensitive code on the same physical CPU ("TRUSTZONE" is a registered trademark of the ARM Corporation). This is realized by the CPU having a state indicating if the CPU is executing in a so-called "secure world" or in a "normal world." The state is propagated on busses to memories and other hardware blocks. Hardware which has the capability to utilize this state is called "TRUSTZONE aware." Isolation is achieved by the fact that secure slaves, such as secure memory, can only be accessed by secure masters such as DMA ("Direct Memory Access") in the secure world, or a CPU executing in the secure world. There is a special CPU instruction to switch between the two worlds, which triggers an exception to a certain address where the code to switch is located, called the "monitor." There is a special CPU mode called secure monitor mode in which the switch can be made.

The applications executed within the TEE are called Trusted Applications (TAs). Trusted Application functions (e.g., services) can be called from rich OS applications. The TEE framework that enables this is shown in the computing device 10 of FIG. 1, which includes a separate Rich Execution Environment (REE) 12 and Trusted Execution Environment (TEE) 14. A TEE client API 30 is called by the rich OS (i.e., the REE 12) to access trusted application services. The TEE driver 28, the monitor 32, and the TEE core 48 are involved in invoking the correct service within the TEE. Trusted applications 44 can call services from the TEE core 48 via the TEE Internal API 46. Examples of such services are cryptographic services, memory management services, and secure time services. There is also the TEE supplicant 36 which is a daemon in the rich REE 12 providing REE services to the TEE core 48, such as non-volatile storage.

The TEE client API and TEE Internal API are standardized within Global Platform (see "Global Platform TEE Client API V1.0" and "Global Platform TEE Internal API V1.0," both available at http://www.globalplatform.org/). For secure time, the TEE Internal API 46 contains functions for handling a trusted application 44 persistent time. There is one function that allows the trusted application 44 to set (i.e., store) its own time reference (a "TA persistent time") and another function that can be called to get the current time of the TA. An example of a trusted application that utilizes secure time is a Digital Rights Management (DRM) TA that needs to keep track of a time reference which is used to evaluate whether a DRM license has expired or not. The time reference may be obtained in a secure way from a license server when downloading the DRM license.

For each TA that has stored a time reference, the TEE 14 is responsible to keep track of the TA persistent time, a stored time reference of the TA persistent time, and detect any attempt to tamper with the TA persistent time. To achieve the highest protection level, the TEE specifications mandate that the TA persistent time is based on a TEE-controlled real-time clock and TEE controlled secure storage. The real-time clock must be out of reach of software attacks from the REE 12.

One known secure time solution for DRM stores the secure time as a time offset towards the real-time clock of the system. The secure time is obtained by reading the real-time clock and compensating according to the stored offset. Whenever the RTC of the system was modified, the offset was also modified accordingly to keep the secure time unchanged. This solution was used in closed OS products where no TEE was used and all code was digitally signed, verified before execution, and trusted to not make non-authorized modifications to the real-time clock or the offset. The offset was integrity protected using a chip individual key while stored in the non-volatile storage.

However, this solution is inadequate for that which is mandated by TEE secure time. With today's products based on Linux/Android, for example, in which more or less all device models can get rooted, the above solution does not apply. Linux/Android cannot be in control of the real-time clock, since Linux/Android cannot be trusted not to be hacked by the device user in order to manipulate the time.

Another known solution implemented hardware (HW) support to prevent a hacker from setting back the clock. In this solution, to set back the clock to a value smaller than the existing one, the value needed to be signed using a private key (RSA) typically available only at OEM customer service centers. The device hardware contained the corresponding public key needed to verify the signed value. Only a successfully verified value smaller than the current value of the real-time clock was accepted by the hardware. However, this solution is also inadequate. Despite its protection against unauthorized rollback of the real-time clock, it is very inflexible and puts restrictions on what time the user himself can set on his device without going to a service center. Thus, this solution also does not prevent unauthorized increase of the real-time clock.

A straight forward solution to achieve a secure time controlled by the TEE that cannot be manipulated by REE 12 would be to have two real-time clocks: one for the "secure world" for the TEE for secure time, and one for the "normal world" to store the user controlled time. This option, however, is expensive in terms of silicon space.

SUMMARY

An exemplary method of maintaining secure time in a computing device is disclosed in which one or more processors implements a Rich Execution Environment (REE), and a separate Trusted Execution Environment (TEE). According to the method, the TEE maintains a real-time clock (RTC) that provides a RTC time to the REE. A RTC offset is stored in non-volatile memory, with the RTC offset indicating a difference between the RTC time and a protected reference (PR) time. Responsive to a request from the REE to read the RTC time, a current RTC time is returned to the REE. Responsive to a request from the REE to adjust the RTC time, the RTC time and the corresponding RTC offset are adjusted by a same amount, such that the PR time is not altered by the RTC adjustment.

In one embodiment, upon every use of the PR time from the TEE and every adjustment of the RTC time, a current PR time is stored in the non-volatile memory. In this embodiment, upon a reboot of the processor implementing the TEE, the following steps are performed: reading a current RTC time, the stored PR time, and the stored RTC offset from the non-volatile memory; calculating a current PR time by adding the stored RTC offset to the current RTC time; comparing the current PR time to the stored PR time; and if the current PR time is less than the stored PR time, adjusting the RTC offset to equal zero, such that the RTC time and the PR time are the same. If the current PR time is less than the stored PR time, a determination may be made that the PR time has been tampered with.

In one embodiment, the non-volatile memory may include a Replay Protected Memory Block (RPMB) that is part of a larger memory unit. In this embodiment, the RPMB supports authenticated read and write operations based on a key shared between the RPMB and the TEE, such that only the TEE is able to modify the contents of the RPMB, and such that the TEE can verify the authenticity of data read from the RPMB. In this embodiment, the REE provides a service to the TEE for sending authenticated read and write requests to the RPMB. In another embodiment, the non-volatile memory includes an Electrically Erasable Programmable Read-Only Memory (EEPROM) unit controlled only by the TEE.

Various trusted application (TA) features may also be supported. For example, in one embodiment, within the TEE, a request is received from a TA executing in the TEE to set a persistent time for the TA. A current PR time is determined from a current RTC time and the stored RTC offset. A difference between the current PR time and the requested persistent time is determined to be a persistent time offset for the TA, and the persistent time offset and a persistent time identifier for the TA are stored in the non-volatile memory. Each of a plurality of TAs may be permitted to store its own persistent time offset in the non-volatile memory, and the persistent time offset of each of the plurality of TAs may be determined based on the same RTC offset.

In one exemplary embodiment, upon receiving a request within the TEE from a TA for its persistent time, the persistent time offset for the TA is retrieved from the non-volatile memory, and the validity of the retrieved persistent time offset is determined. Responsive to a determination that the retrieved persistent time offset is valid, the following steps are performed: determining the persistent time based on the persistent time offset and a current PR time calculated from a current RTC time and the stored RTC offset; and transmitting the persistent time to the TA. Responsive to a determination that the retrieved persistent time offset is not valid, an error is returned to the TA indicating that the TA persistent time has been tampered with. The validity of the retrieved persistent time may be determined by comparing a stored and a current RTC counter.

An exemplary secure time computing device is also disclosed. The computing device provides both a Trusted Execution Environment (TEE) and a separate Rich Execution Environment (REE), and comprises a TEE circuit that includes a first processor, and a REE circuit that includes the same or another processor. The TEE circuit is configured to implement the TEE and to maintain a real-time clock (RTC) in the TEE, with the RTC providing a RTC time to the REE; and to store a RTC offset in non-volatile memory, with the RTC offset indicating a difference between the RTC time and a protected reference (PR) time. The REE circuit is configured to implement the REE and to use RTC as its clock. The TEE circuit is also configured to: return a current RTC time based on the TEE receiving a request from the REE to read the RTC time; and adjust the RTC time and the corresponding RTC offset by a same amount, based on the TEE receiving a request from the REE to adjust the RTC time, such that the PR time is not altered by the RTC adjustment.

In one exemplary embodiment, the TEE circuit is further configured to store a current PR time in the non-volatile memory upon every use of PR time from the TEE and every adjustment of the RTC time. Then, upon a reboot of the processor implementing the TEE, the TEE circuit is configured to read a current RTC time, the stored PR time, and the stored RTC offset from the non-volatile memory, and calculate a current PR time by adding the stored RTC offset to the current RTC time. The TEE circuit compares the current PR time to the stored PR time, and if the current PR time is less than the stored PR time, adjusts the RTC offset to equal zero, such that the RTC time and the PR time are the same. The TEE circuit may also be configured to determine that the PR time has been tampered with if the current PR time is less than the stored PR time.

In one embodiment, the non-volatile memory may include a Replay Protected Memory Block (RPMB) that is part of a larger memory unit. In this embodiment, the RPMB supports authenticated read and write operations based on a key shared between the RPMB and the TEE, such that only the TEE is able to modify the contents of the RPMB, and such that the TEE can verify the authenticity of data read from the RPMB. In this embodiment, the REE provides a service to the TEE for sending authenticated read and write requests to the RPMB. In another embodiment, the non-volatile memory includes an Electrically Erasable Programmable Read-Only Memory (EEPROM) unit controlled only by the TEE.

According to one exemplary embodiment, the TEE circuit and the REE circuit are implemented by a single processor utilizing ARM TRUSTZONE technology, in which a TRUSTZONE security state of the processor is propagated via buses internally within the computing device for each access to memory and peripherals including the RTC. In this embodiment, address filtering of access is done in or in front of memory and peripherals belonging to TEE based on the security state. In the same or another embodiment, the TEE circuit and the REE circuit are implemented by a single processor, wherein both the REE and the TEE are implemented by the single processor as virtual machines, with the RTC being under the control of the TEE virtual machine. In another embodiment, the TEE circuit includes a first processor, and the REE circuit includes a different second processor.

The computing device may also support various trusted application (TA) features. For example, in one embodiment, the TEE circuit is further configured to receive a request from a TA executing in the TEE to set a persistent time for the TA. Based on this request, the TEE circuit determines a current PR time from a current RTC time and the stored RTC offset, determines a difference between the current PR time and the requested persistent time to be a persistent time offset for the TA, and stores the persistent time offset and a persistent time identifier for the TA in the non-volatile memory. Each of a plurality of TAs may be permitted to store its own persistent time offset in the non-volatile memory, and the persistent time offset of each of the plurality of TAs may be determined based on the same RTC offset.

The TEE circuit may be further configured to receive a request from the TA for its persistent time. The TEE circuit retrieves the persistent time offset for the TA from the non-volatile memory, and determines the validity of the retrieved persistent time offset. Responsive to a determination that the retrieved persistent time offset is valid, the TEE circuit is configured to determine the persistent time based on the persistent time offset and a current PR time calculated from a current RTC time and the stored RTC offset, and transmit the persistent time to the TA. Responsive to a determination that the retrieved persistent time offset is not valid, the TEE circuit is configured to return an error to the TA indicating the TA persistent time is tampered with. The validity of the retrieved persistent time may be determined by comparing a stored and a current RTC counter.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 2:
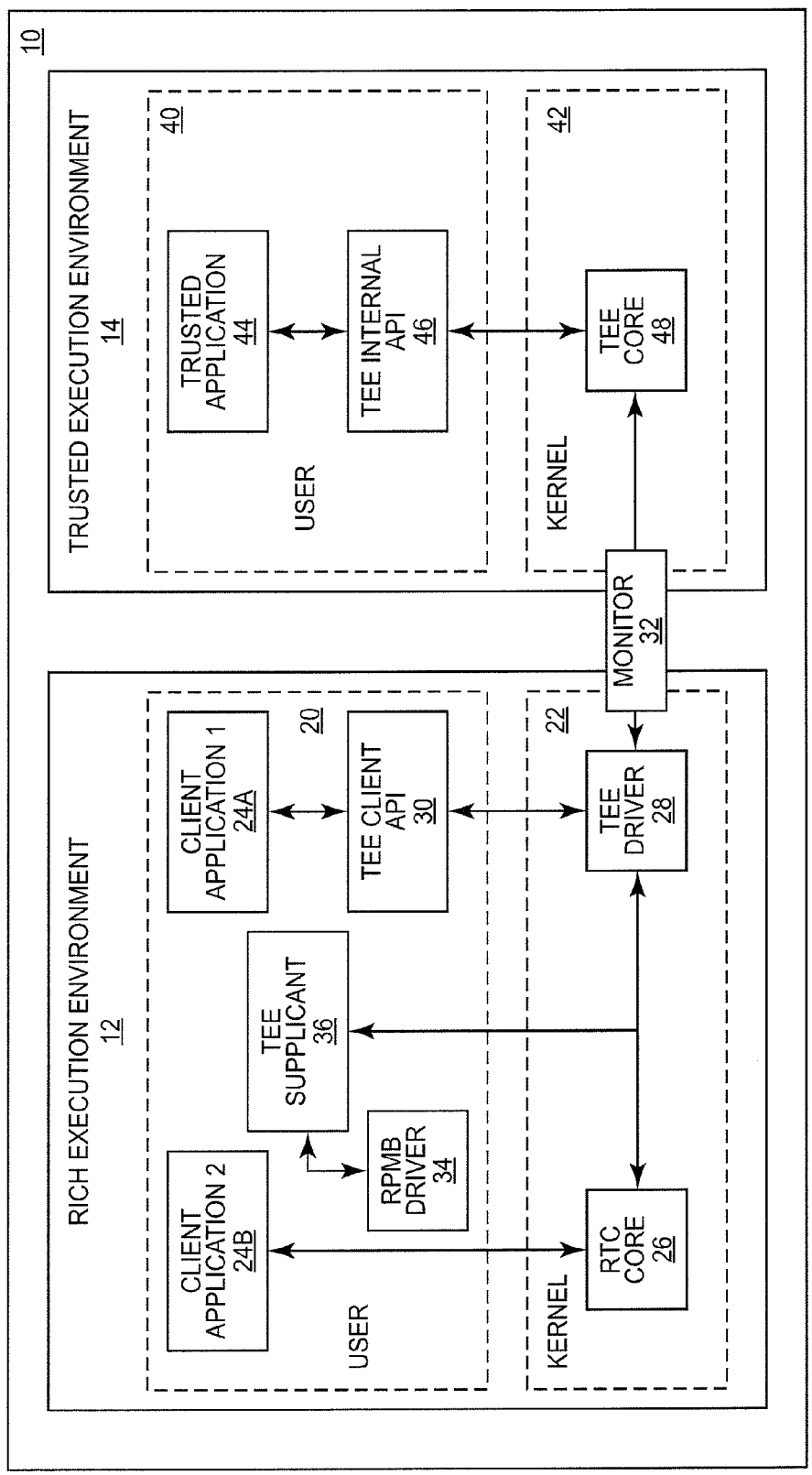
FIG. 2 illustrates a software configuration of a secure time computing device that implements a separate Rich Execution Environment (REE) and Trusted Execution Environment (TEE).

FIG. 2 illustrates an example software configuration for a secure time computing device 10 in which one or more processors implement a Rich Execution Environment (REE) 12 and a separate Trusted Execution Environment (TEE) 14. The TEE 14 maintains a real-time clock (RTC) through associated RTC hardware (HW) 74, 84 (see FIGS. 3-5) that provides a RTC time to the REE 12. That is, the RTC HW is under TEE 14 control, and within a TEE core 48 the TEE 14 provides functions to get the RTC time from the RTC HW and to set the RTC time to the RTC HW. In this regard, the RTC HW can be considered a "trusted" peripheral.

Figure 3:
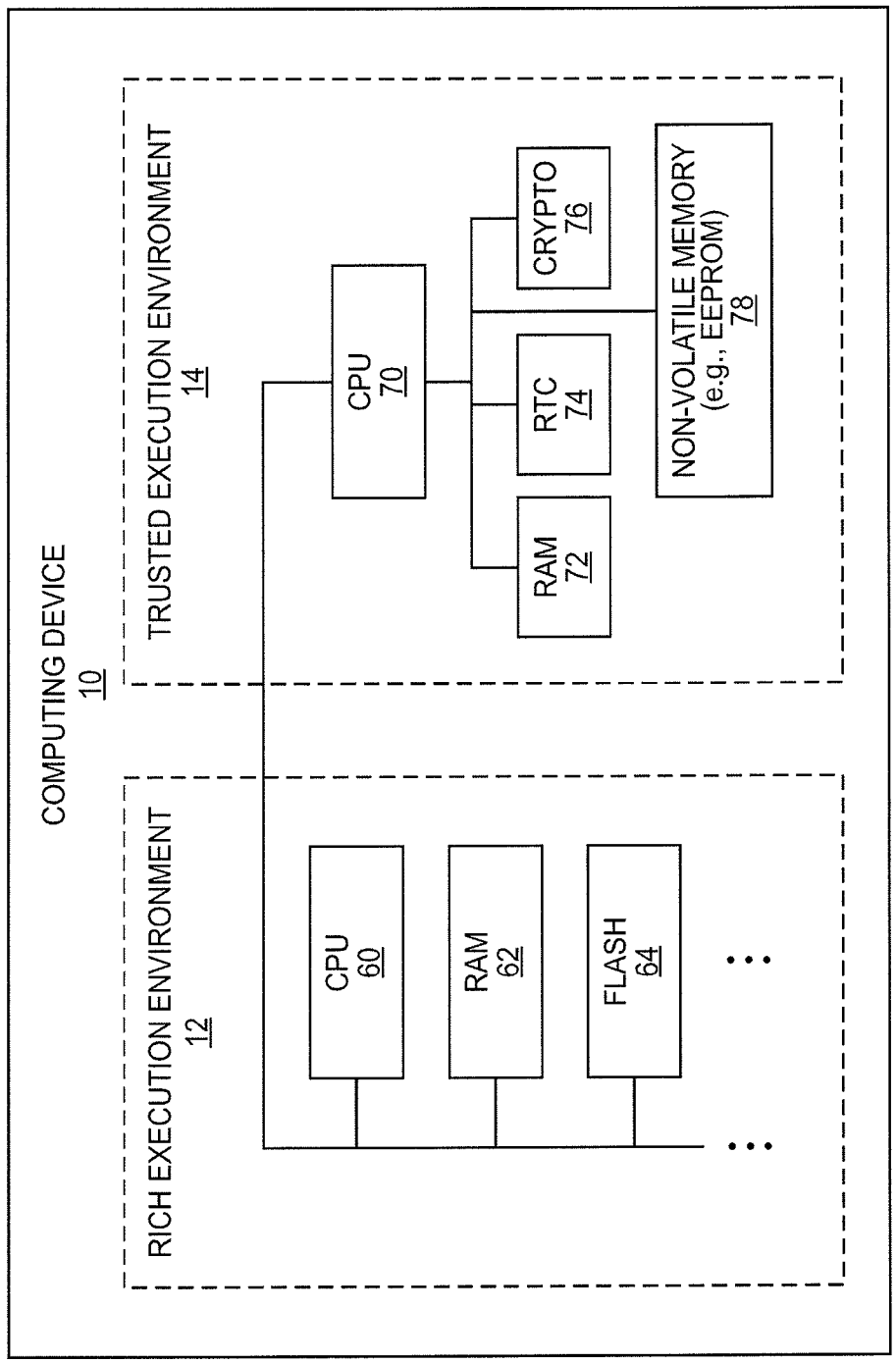
FIG. 3 illustrates a first example hardware configuration for the computing device of FIG. 2.
Figure 4:
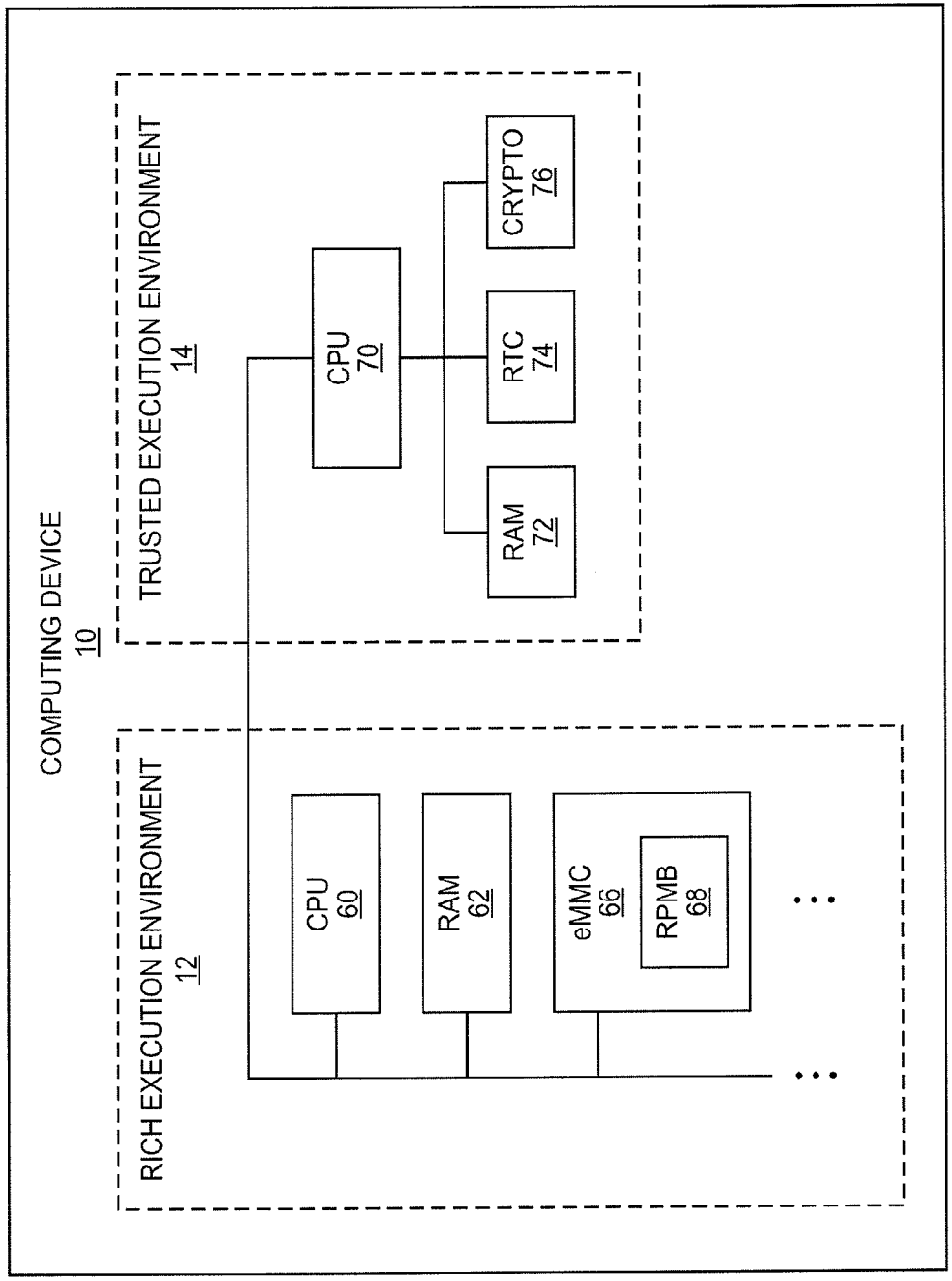
FIG. 4 illustrates a second example hardware configuration for the computing device of FIG. 2.

A RTC offset that indicates a difference between the RTC time and a protected reference (PR) time is stored in non-volatile memory (see, e.g., EEPROM 78 of FIG. 3 and eMMC 66 of FIG. 4). Responsive to a request from the REE 12 to read the RTC time, a current RTC time is returned to the REE 12. Responsive to a request from the REE 12 to adjust the RTC time, the RTC time and the corresponding RTC offset are adjusted by a same amount, such that the PR time is not altered by the RTC adjustment. Thus, the computing device implements the PR time and the RTC time using one common RTC hardware block (see RTC 74, 84 in FIGS. 3-5).

The computing device 10 allows the REE 12 to freely change the RTC back and forth, but always maintains the PR time as an offset so that tampering may be detected. Thus, there is no possibility of the REE 12 successfully changing the PR time of the TEE 14, because the PR time is protected from software attacks from the REE 12. This tamper protection will be discussed below in greater detail. Advantageously, a single hardware RTC 74, 84 (see FIGS. 3-5) is utilized to provide the RTC, so that two separate clocks do not need to be implemented in the computing device 10, which reduces hardware requirements for the computing device 10, while still providing secure time. The RTC offset (along with a current PR time) are stored in non-volatile memory, and these values may be integrity protected using a chip individual key, and optionally also using replay protection.

The REE 12 includes a user space 20 and a kernel 22. Similarly, the TEE 14 also includes a user space 40 and a kernel 42. In one example, the REE corresponds to a Windows or Linux-based operating system. Each of the kernels 22, 42 acts as a bridge between applications and the actual data processing done at the hardware level. Applications are executed in the user spaces 20, 40. In the REE user space 20, one or both of client applications 24A-B are executed, and in the TEE user space 40 a trusted application (TA) 44 is executed. Although two client applications 24A-B are illustrated, it is understood that these multiple client applications 24 are shown to illustrate various ways of accessing the TEE, and it is further understood that single client application 24 could be utilized. The trusted and client applications may be related. For example, the client application 24 may be configured to utilize the HTTPS protocol to download license files, and the TA 44 may include a Digital Rights Management (DRM) agent that validates the downloaded license files.

Figure 1:
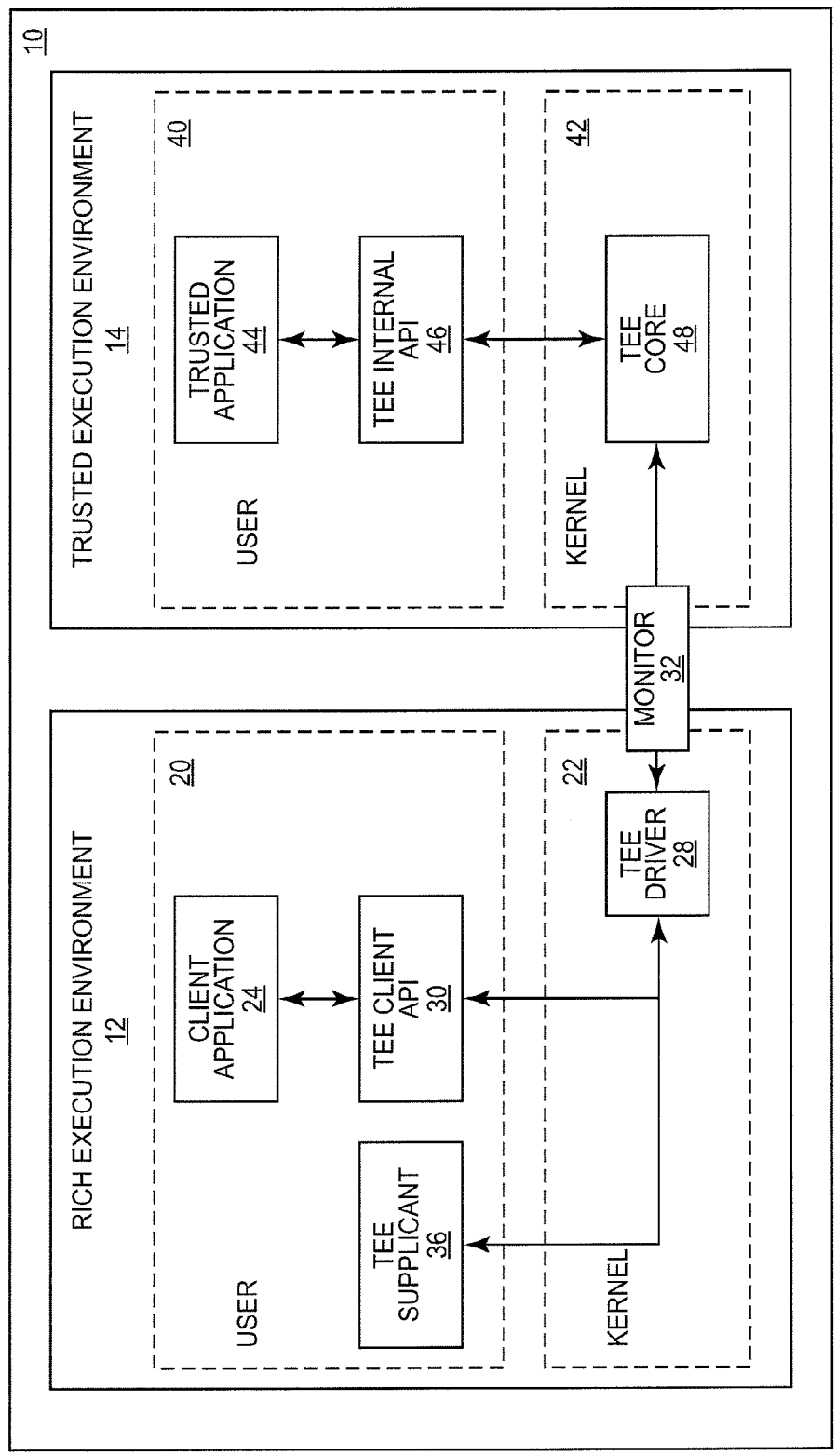
FIG. 1 illustrates a prior art TEE architecture.

The REE kernel 22 provides an RTC core 26 and a TEE driver 28, and the TEE kernel 42 provides the TEE core 48. As shown in FIG. 1, the TA 44 interacts with the TEE core 48 using a TEE internal API 46. More information on the TEE internal API 46 is available in the "TEE Internal API Specification V1.0" from http://www.globalplatform.org. As shown in FIG. 2, a monitor 32 acts as a bridge between the TEE driver 28 and TEE core 48, and can facilitate the transition of a TRUSTZONE-enabled CPU from a "normal world" to a "secure world" (see, e.g., CPU 80 of FIG. 5).

Referring now to the REE 12, TEE driver 28 provides access to the TEE 14 for client applications 24 through either the RTC core 26 or a TEE client API 30. The RTC core 26 provides an interface for client applications to obtain or set the RTC time (with the obtaining or setting being performed by the TEE core 48). The TEE client API 30 provides a more generic interface for client applications 24 to access any trusted application function, but not the TEE core 48 itself. More information on the TEE client API may be found in the "TEE Client API Specification V1.0" from http://www.globalplatform.org. In one example, the RTC core corresponds to a standard Linux kernel driver. Optionally, the user space 20 may also include a Replay Protected Memory Block (RPMB) driver 34 and a TEE supplicant 36 (if RPMB features are utilized). Collectively, the RPMB driver 34 and TEE supplicant 36 are used to store and retrieve values from a RPMB (see FIG. 4). As discussed above, the TEE supplicant 36 is a daemon providing REE memory services.

FIG. 3 illustrates a first example hardware configuration for the computing device 10 of FIG. 2. In the example of FIG. 3, the REE 12 includes a central processing unit (CPU) 60 Random Access Memory 62, and flash memory 64 (collectively a "REE circuit"). The RAM 62 is used to launch client applications 24 in the REE 12. The TEE 14 includes a CPU 70, RAM 72, a RTC 74, cryptographic circuit 76, and a non-volatile Electrically Erasable Programmable Read-Only Memory (EEPROM) 78 controllable only by the TEE 14 (collectively a "TEE circuit"). Of course, although EEPROM 78 is illustrated, it is understood that this is only a non-limiting example, and it is understood that other types of non-volatile memory could be used in the TEE 14. In the embodiment of FIG. 3, time values such as the RTC offset, and previous RTC time and PR time values, are stored in the EEPROM 78. The RTC 74 provides a RTC time to both the REE 12 and TEE 14.

The RTC 74 may be powered by a main battery (not shown) of the computing device 10, so that the RTC 74 can keep its time even though the computing device 10 is powered off. A back-up battery or capacitor (also not shown) may be used in combination with the main battery to keep the RTC 74 powered for some extra time even though the main battery is fully drained (e.g., on the order of several days). The cryptographic circuit 76 may include, for example, one-time programmable (OTP) memory used to store an individual key that may be unique to the TEE 14. The RAM 72 is used to launch trusted applications (TAs) 44. In one example, the RAM 72 is or includes embedded static RAM (eSRAM). As shown in FIG. 3, separate CPUs 60, 70 are utilized to implement the REE 12 and TEE 14.

FIG. 4 illustrates another example hardware configuration for the computing device 10, in which separate CPUs 60, 70 are also utilized to implement the REE 12 and TEE 14, but where the time values discussed above (RTC offset, and previous RTC time and PR time) are stored in the REE 12 instead of the TEE 14. In this embodiment, the REE 12 includes non-volatile memory in the form of an embedded MultiMediaCard (eMMC) 66 which includes a Replay Protected Memory Block (RPMB) 68. The RPMB 68 supports authenticated read and write operations based on a key shared between the RPMB 68 and the TEE 14, such that only the TEE 14 is able to modify the contents of the RPMB 68, and such that the TEE 14 can verify the authenticity of data read from the RPMB 68. In this embodiment, the REE 12 provides a service to the TEE 14 for sending authenticated read and write requests to the RPMB 68. The shared key may be stored in the cryptographic engine 76, or may be derived from an individual key stored in the cryptographic engine 76 (e.g., a key that is unique to the computing device 10). In one example, the cryptographic engine 76 includes a OTP memory to store the individual key. By using the shared key, the TEE 14 can perform authenticated and integrity protected writing and reading of data to and from the RPMB 68 partition. That is, any reading and writing of data cannot be manipulated by the REE 12. In one example, the RMPB integrity protection may utilize HMAC SHA-256 hashing. In this embodiment the "REE circuit" includes items 60, 62, 66 and 68, while the "TEE circuit" includes items 70, 72, 74, 76.

Thus, in one or more embodiments, the non-volatile memory may include a Replay Protected Memory Block (RPMB) 68 that is part of a larger memory unit 66. In such embodiments, the RPMB 68 supports authenticated read and write operations based on a key shared between the RPMB 68 and the TEE 14, such that only the TEE 14 is able to modify the contents of the RPMB 68, and such that the TEE 14 can verify the authenticity of data read from the RPMB 68. In such embodiments, the REE 12 provides a service to the TEE 14 for sending authenticated read and write requests to the RPMB 68 (e.g., via RPMB driver 34 and TEE supplicant 36).

Figure 5:
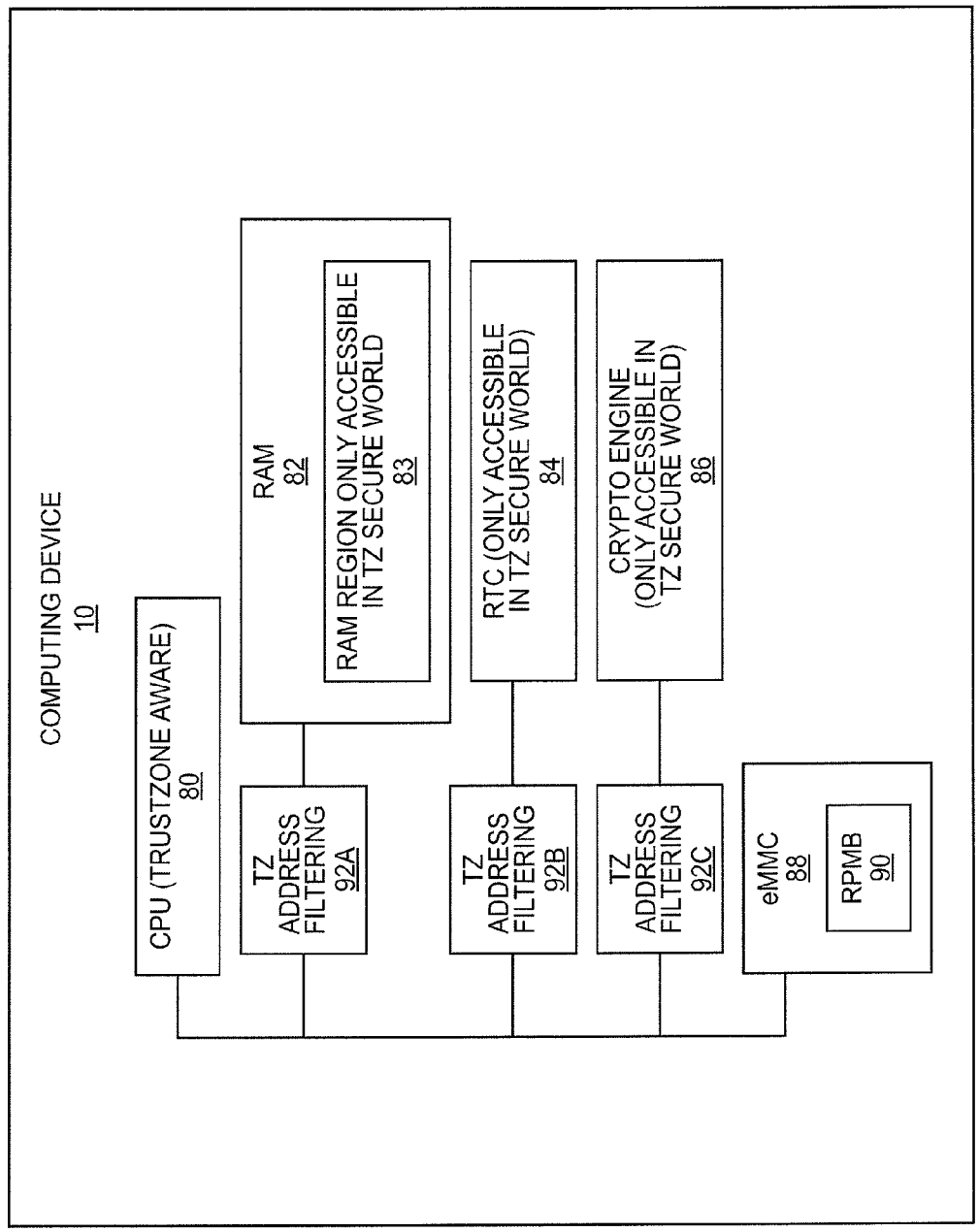
FIG. 5 illustrates a third example hardware configuration for the computing device of FIG. 2, in which TRUSTZONE technology is utilized.

FIG. 5 illustrates yet another example hardware configuration for the computing device 10, in which a single processor is used, with that single processor utilizing TRUSTZONE technology. In this embodiment, the RTC 84 and cryptographic engine 86 are only included in the TEE circuit; the RPMB 90 is only included in the REE circuit; and the CPU 80, RAM 82, address filtering circuits 92, and eMMC 88 are shared between the TEE and REE circuits. As shown in FIG. 5, the computing device includes a single CPU 80, along with RAM 82, an RTC 84, and a cryptographic engine 86. The computing device also includes an eMMC 88 which includes a Replay Protected Memory Block (RPMB) 90 to support authenticated read and write operations based on a key shared between the RPMB 90 and the cryptographic engine 86. In a similar fashion to the embodiments of FIGS. 3-4, the shared key may be stored in the cryptographic engine 86, or may be derived from another key stored in the cryptographic engine 86.

Within the larger RAM 82 (accessible by both REE 12 and TEE 14), there is a smaller RAM portion 83 that is only accessible by the TEE 14. The computing device uses TRUSTZONE address filtering circuits 92A-C so that the RAM portion 83, the RTC 84, and the cryptographic engine 86 are only accessible in the TEE 14 (which executes in the so-called "secure world"). In one example, the RAM 82 (or at least the RAM portion 83) is or includes embedded SRAM (eSRAM). In such TRUSTZONE embodiments, the circuits implementing the REE 12 and TEE 14 are implemented by a single processor 80 utilizing ARM TRUSTZONE technology, in which a TRUSTZONE security state of the processor 80 is propagated via buses internally within the computing device 10 for each access to RAM 82 and trusted peripherals (e.g., the RTC 84 and cryptographic engine 86). In this embodiment, filtering of access is done in or in front of memory 82 and peripherals belonging to TEE 14 based on the security state. In the same or another embodiment, the TEE and the REE are implemented by a single processor as virtual machines, with the RTC being under the control of the TEE virtual machine.

Referring to FIGS. 3-5 collectively, in each of these embodiments the "REE circuit" includes a REE CPU (e.g., CPU 60 or 80), and the "TEE circuit" includes a TEE CPU (e.g., CPU 70 or 80) that are configured to perform the methods outlined below. Within the single CPU 80 of FIG. 5, it is possible that the REE and TEE circuits may correspond to separate portions of the CPU 80, or that they may correspond to the same part of the CPU 80. Under either case (single or multiple processors), the TEE circuit is configured to maintain a real-time clock (RTC) in the TEE, with the RTC providing a RTC time to the REE; and to store a RTC offset in non-volatile memory, with the RTC offset indicating a difference between the RTC time and a protected reference (PR) time. The REE circuit is configured to use RTC as its clock. The TEE circuit is also configured to: return a current RTC time based on the TEE receiving a request from the REE to read the RTC time; and adjust the RTC time and the corresponding RTC offset by a same amount, based on the TEE receiving a request from the REE to adjust the RTC time, such that the PR time is not altered by the RTC adjustment.

Figure 6:
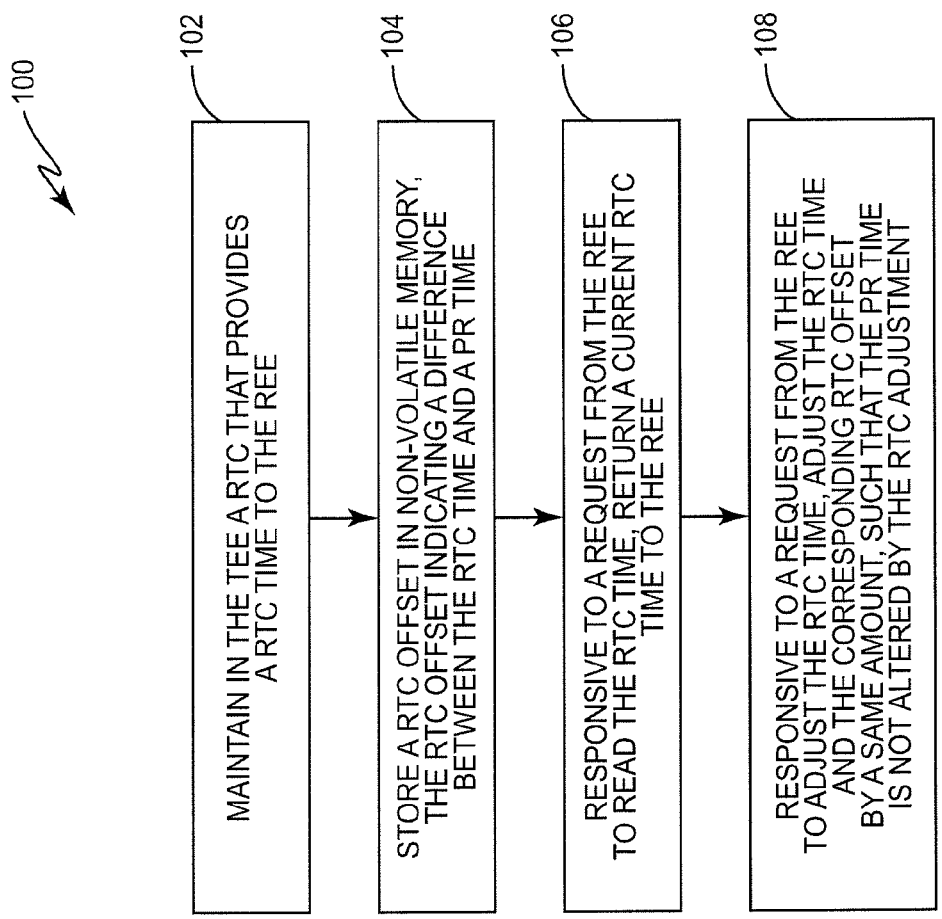
FIG. 6 illustrates an exemplary method of maintaining secure time.

Referring now to FIG. 6, an exemplary method 100 is illustrated of maintaining secure time in the computing device 10, in which one or more processors implements the REE 12, and the separate TEE 14. The TEE 14 maintains the RTC that provides a RTC time to the REE 12 (step 102). A RTC offset that indicates a difference between the RTC time and the PR time is stored in non-volatile memory (step 104). Responsive to a request from the REE 12 to read the RTC time, a current RTC time is returned to the REE 12 (step 106). Responsive to a request from the REE 12 to adjust the RTC time, the RTC time and the corresponding RTC offset are adjusted by a same amount (step 108), such that the PR time is not altered by the RTC adjustment.

FIGS. 7-10 are call flow diagrams illustrating various exemplary operations of the computing device 10. Although each of these call flow diagrams indicates inclusion of RPMB memory, as discussed above, inclusion of RMPB is only an example, and if excluded the "RMPB Driver" shown in these figures could instead correspond to a driver for storing/retrieving data from other non-volatile memory, such as the EEPROM 78 of FIG. 3. Alternatively, if the TEE core 48 may act as its own driver for TEE memory (e.g., the EEPROM 78).

Figure 7:
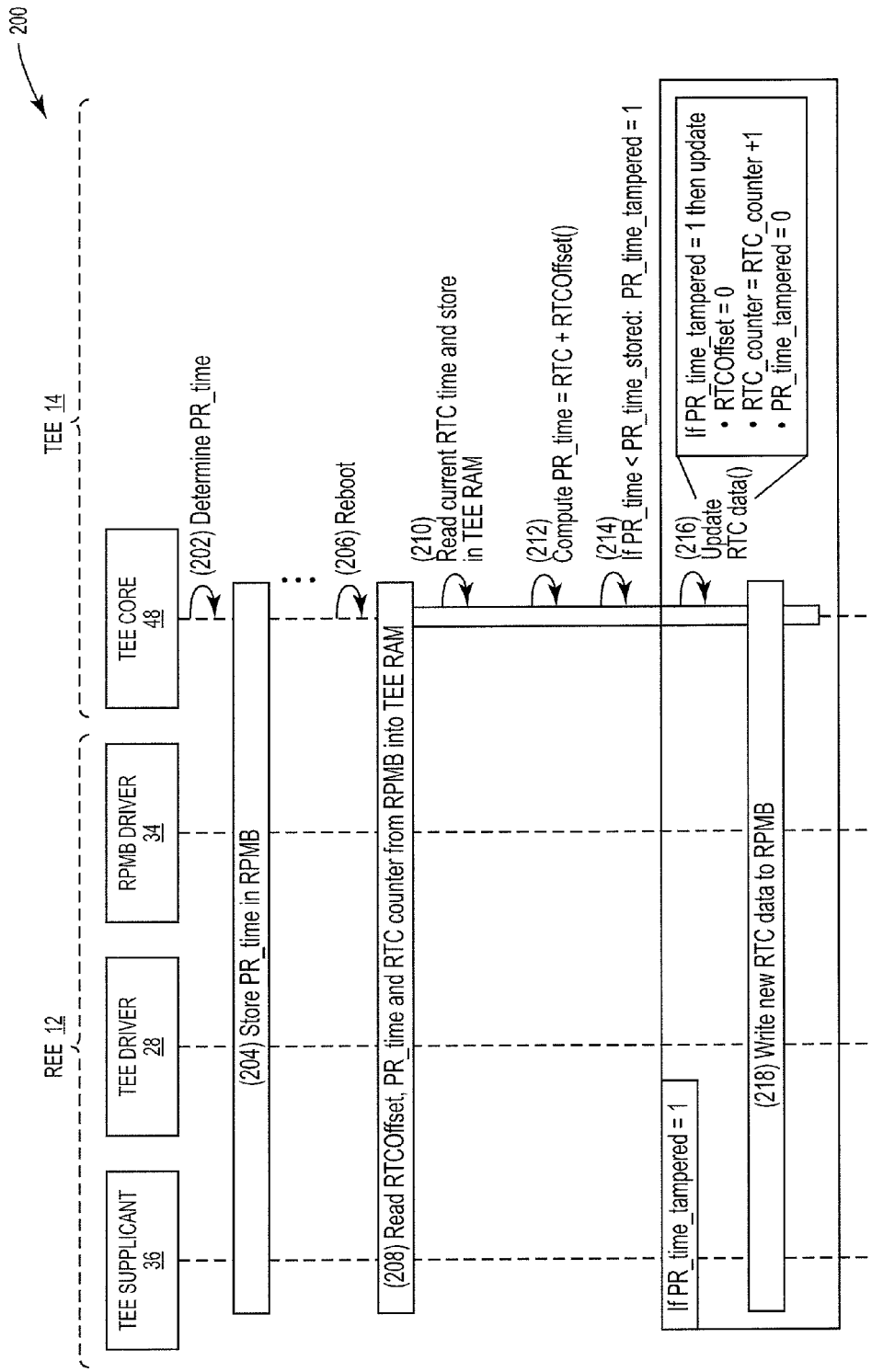
FIG. 7 is a call flow diagram illustrating a protected reference time verification.

Referring to FIG. 7, a call flow diagram 200 illustrating a PR time verification is shown. Prior to a reboot (step 206) occurring, the TEE core 48 determines a current PR time value (step 202), and stores that value in the RPMB via RPMB driver 34 (step 204). Step 204 may be performed in response to any of the following: adjustment of the RTC, determination of PR time, and use of a determined PR time. After the reboot of the TEE processor occurs (step 206), values for the RTC offset, the PR time and a RTC counter are retrieved from the RPMB into the TEE RAM (step 208). The secure TEE RAM may correspond to the RAM 72 or 83 of FIGS. 3-5, for example. The current RTC time is determined (step 210). A current PR time is then computed, based on the determined RTC time and the RTC offset (step 212).

The determined PR time ("PR_time") is then compared to the stored PR time from step 208 ("PR_time_stored") (step 214). If the determined PR time is less than the stored PR time, indicating that a PR time setback has occurred, tampering is detected and a corresponding tamper detection indicator ("PR_time_tampered") is set to "1" (or some other representative value). If PR_time_tampered is "1" then steps 216-218 are performed. In step 216, the RTC offset is adjusted to equal zero, such that the PR time and the RTC time are the same. Additionally, an RTC counter ("RTC_counter") is incremented, to keep a running total of tampering events. In step 218, the new RTC data are written to the RPMB (or other secure memory).

Thus, the operations of FIG. 7 may be summarized as follows: upon every use of the PR time from the TEE and every adjustment of the RTC time, a current PR time is stored in non-volatile memory. Upon a reboot of the processor implementing the TEE, the following steps are performed: reading a current RTC time, the stored PR time, and the stored RTC offset from non-volatile memory; calculating a current PR time by adding the stored RTC offset to the current RTC time; and comparing the current PR time to the stored PR time. If the current PR time is less than the stored PR time, the RTC offset is adjusted to equal zero, such that the RTC time and the PR time are the same. If the current PR time is less than the stored PR time, then the PR time is determined to have been tampered with.

Figure 8:
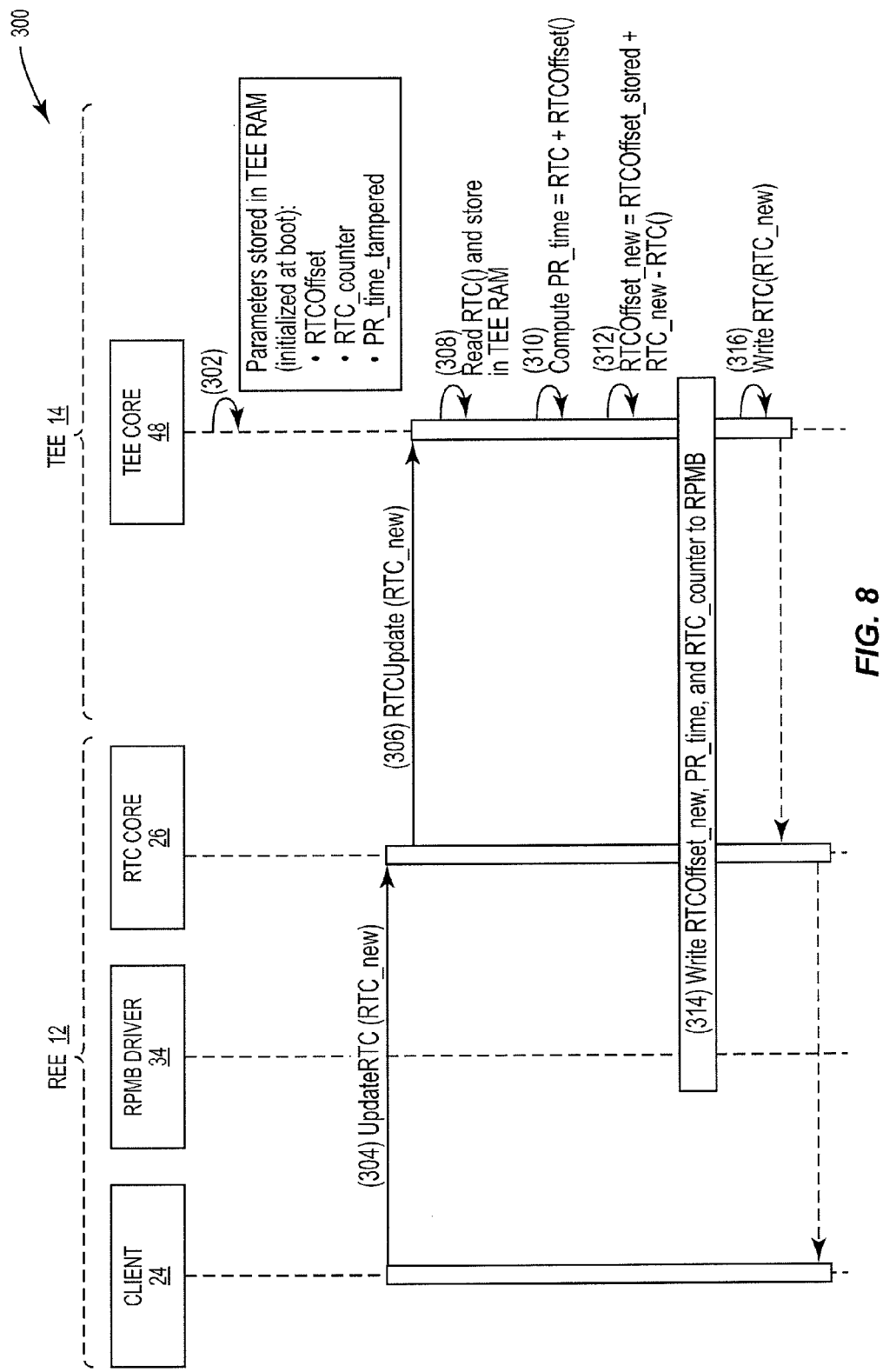
FIG. 8 is a call flow diagram illustrating an RTC update.

FIG. 8 is a call flow diagram illustrating an RTC update process 300, through which a client application 24 requests to update the RTC time. Initially, the RTC offset, RTC counter and "PR_time_tampered" values are loaded into TEE RAM (e.g. RAM 72, 83) if not already present in the TEE RAM (step 302). The client application 24 sends an request to the RTC core 26 (step 304), which in turn sends a corresponding request to the TEE core 48 (step 306). The TEE core 48 reads a current RTC value and stores it in the TEE RAM (step 308). The current PR time is calculated based on the RTC and the stored RTC offset (step 310). A new RTC offset is then determined based on the stored RTC offset, the requested new RTC time, and the determined current RTC (step 312). The new RTC offset, current PR time, and current RTC counter values are then stored in the RPMB (step 314), and the new RTC value is correspondingly updated (step 316), and propagated back to the requesting client application 24.

Figure 9:
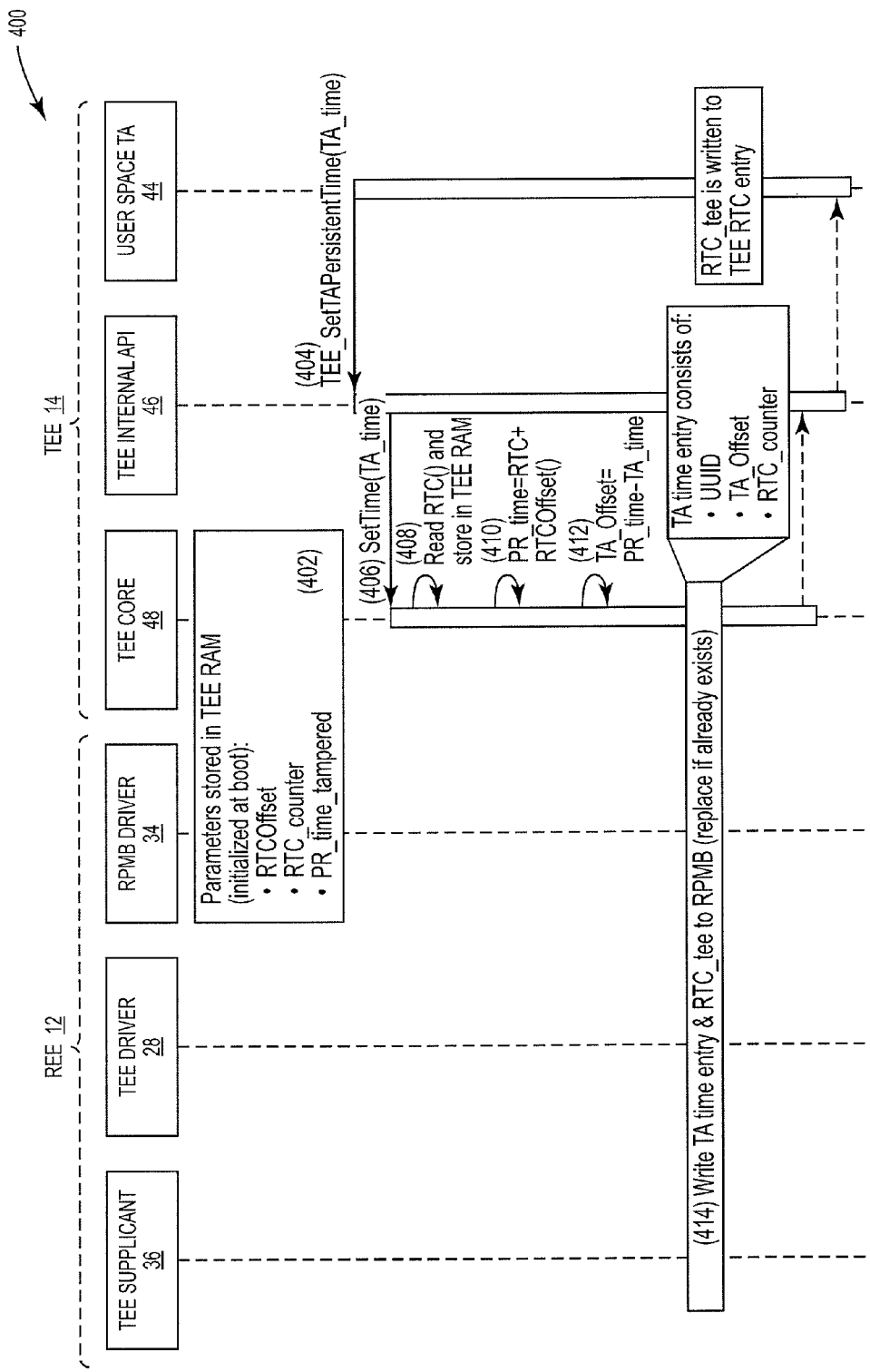
FIG. 9 is a call flow diagram illustrating the setting of a TA persistent time.

FIG. 9 is a call flow diagram illustrating the setting of a TA persistent time. In a first step, after booting up, the processor implementing the TEE (e.g., CPU 70) retrieves the RTC offset, RTC counter, and PR_time_tampered values from the RPMB and stores them in its TEE RAM (e.g., RAM 72, 83) (step 402). Within the TEE 14, a request is received from a trusted application (TA) 44 to set a persistent time (step 404), and a corresponding request is sent to the TEE core 48 (step 406). The current RTC time is determined, and stored in TEE RAM (step 408). The PR time is determined based on the RTC time and RTC offset (step 410). A TA offset is then determined (step 412) based on a difference between the PR time and the requested TA time. The TA offset is saved in RPMB as a TA time entry, which includes a universally unique identifier (UUID) that acts as a persistent time identifier, the TA offset, and the current RTC counter value (step 414). Each TA is identified by its UUID. Thus, the UUID is stored to be able to determine the TA that a given the TA time entry corresponds to.

Thus, the operations of FIG. 9 may be summarized as follows: within the TEE 14, a request is received from a TA 44 executing in the TEE 14 to set a persistent time for the TA. A current PR time is determined from a current RTC time and the stored RTC offset, and a difference between the current PR time and the requested persistent time is determined to be a persistent time offset for the TA 44. The persistent time offset and a persistent time identifier for the TA are stored in non-volatile memory. In one example, each of a plurality of TAs is permitted to store its own persistent time offset in the non-volatile memory, and the persistent time offset of each of the plurality of TAs is determined based on the same RTC offset.

Figure 10:
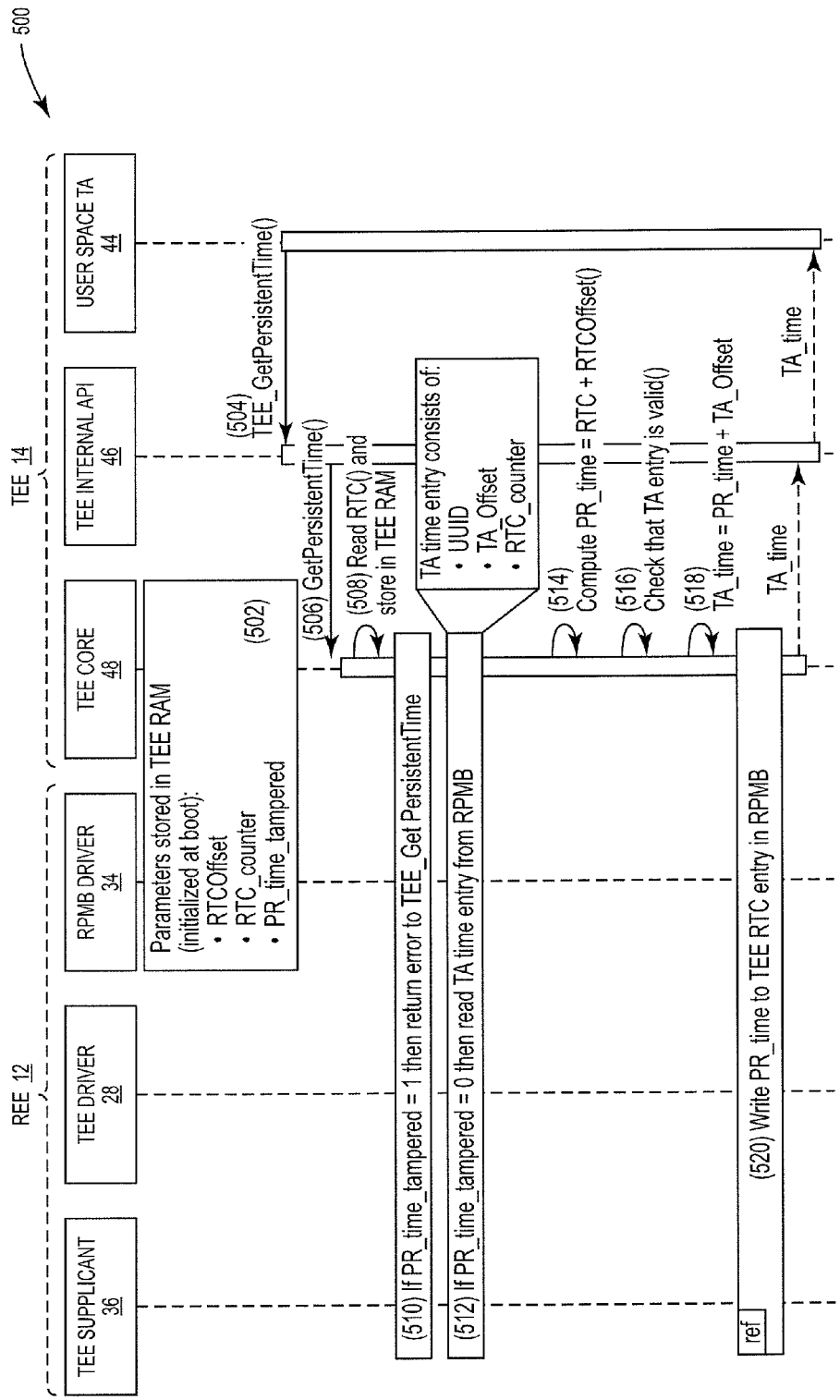
FIG. 10 is a call flow diagram illustrating steps for providing a TA persistent time to its corresponding TA.

FIG. 10 is a call flow diagram illustrating a process 500 for providing a TA persistent time to its corresponding TA 44. In a first step, after booting up, the processor implementing the TEE (e.g., CPU 70) retrieves the RTC offset, RTC counter, and PR_time_tampered values from the RPMB and stores them in its TEE RAM (step 502). Within the TEE 14, a request is received from a TA 44 to get its stored persistent time (step 504), and a corresponding request is sent to the TEE core 48 (step 506). The RTC is read and the RTC time is stored in TEE RAM (step 508). If the value of PR_time_tampered retrieved in step 502 is "1" (indicating that tampering has occurred since the TA persistent time was previously stored), an error is returned to the requesting TA 44 (step 510).

Otherwise, if the retrieved value of PR_time_tampered is "0" then the TA time entry is read from the RPMB (step 512), which includes the stored UUID, TA offset, and RTC counter. The current PR time is determined (step 514), and a check is performed to determine that the stored TA time entry is valid (step 516). If the TA entry is valid, then the TA time (i.e., "TA persistent time") is determined by adding the PR time and the TA offset (step 518), and the PR time is written to the RPMB and is returned to the TA 44 (step 520).

Referring to step 516, the TA time entry is considered invalid if PR_time_tampered=1, which indicates that the PR time has been tampered with since the creation of the TA time. Additionally, the TA time entry may be considered invalid if the RTC counter in the TA time entry does not match the RTC counter retrieved in step 502. In this latter example, the validity of the retrieved persistent time offset is be determined by retrieving a stored RTC counter value from the non-volatile memory, the RTC counter being indicative of a number of detected PR time tampering events at the time that the persistent time offset was stored in the non-volatile memory; and determining that the retrieved persistent time offset is valid if the retrieved RTC counter value is equal to a current RTC counter value that is indicative of a number of detected PR time tampering events at the time that the request from the TA for its persistent time was received.

Thus, the operations of FIG. 10 may be summarized as follows: within the TEE 14, a request is received from a TA 44 for its persistent time. The persistent time offset for the TA is retrieved from the non-volatile memory, and the validity of the retrieved persistent time offset is determined. Responsive to a determination that the retrieved persistent time offset is valid, the following steps are performed: determining the persistent time based on the persistent time offset and a current PR time calculated from a current RTC time and the stored RTC offset; and transmitting the persistent time to the TA. Responsive to a determination that the retrieved persistent time offset is not valid, an error is returned to the TA 44 indicating that the TA persistent time has been tampered with.

Embodiments of the present invention provide numerous benefits and advantages over the prior art, including use of a single hardware RTC to provide the RTC, so that two separate clocks do not need to be implemented in a computing device, which reduces hardware requirements for the computing device, while still providing secure time. Additionally, unlike prior art solutions, the TEE maintains control of the RTC, which can provide the added security not available in current mobile device operating systems (e.g., Android-based operating systems) that cannot be trusted not to be hacked by a device user seeking to manipulate the time.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of maintaining secure time in a computing device in which one or more processors implements a Rich Execution Environment (REE), and a separate Trusted Execution Environment (TEE), the method comprising:
   maintaining in the TEE, a real-time clock (RTC) that provides a RTC time to the REE;
   storing a RTC offset in non-volatile memory, the RTC offset indicating a difference between the RTC time and a protected reference (PR) time, wherein the RTC time and the PR time are not the same;
   responsive to a request from the REE to read the RTC time, returning a current RTC time to the REE;
   responsive to a request from the REE to adjust the RTC time, adjusting the RTC time and the corresponding RTC offset by a same amount, such that the PR time is not altered by the RTC adjustment; and
   upon every use of the PR time from the TEE and every adjustment of the RTC time, storing a current PR time in the non-volatile memory.

2. The method of claim 1, further comprising:
   upon a reboot of the processor implementing the TEE:
   reading a current RTC time, the stored PR time, and the stored RTC offset from the non-volatile memory;
   calculating a current PR time by adding the stored RTC offset to the current RTC time;
   comparing the current PR time to the stored PR time; and
   if the current PR time is less than the stored PR time, adjusting the RTC offset to equal zero, such that the RTC time and the PR time are the same.

3. The method of claim 2, further comprising:
   determining from the current PR time being less than the stored PR time that the PR time has been tampered with.

4. The method of claim 1:
   wherein the non-volatile memory includes a Replay Protected Memory Block (RPMB), the RPMB being part of a larger memory unit;
   wherein the RPMB supports authenticated read and write operations based on a key shared between the RPMB and the TEE, such that only the TEE is able to modify the contents of the RPMB, and such that the TEE can verify the authenticity of data read from the RPMB; and
   wherein the REE provides a service to the TEE for sending authenticated read and write requests to the RPMB.

5. The method of claim 1, wherein the non-volatile memory includes an Electrically Erasable Programmable Read-Only Memory (EEPROM) unit controlled only by the TEE.

6. The method of claim 1, further comprising:
   receiving, within the TEE, a request from a trusted application (TA) executing in the TEE to set a persistent time for the TA;
   determining a current PR time from a current RTC time and the stored RTC offset;
   determining a difference between the current PR time and the requested persistent time to be a persistent time offset for the TA; and
   storing the persistent time offset and a persistent time identifier for the TA in the non-volatile memory.

7. The method of claim 6, wherein each of a plurality of TAs is permitted to store its own persistent time offset in the non-volatile memory, and wherein the persistent time offset of each of the plurality of TAs is determined based on the same RTC offset.

8. The method of claim 6, further comprising:
   receiving, within the TEE, a request from the TA for its persistent time;
   retrieving the persistent time offset for the TA from the non-volatile memory, and
      determining the validity of the retrieved persistent time offset;
   responsive to a determination that the retrieved persistent time offset is valid:
      determining the persistent time based on the persistent time offset and a current PR time calculated from a current RTC time and the stored RTC offset; and
      transmitting the persistent time to the TA; and
   responsive to a determination that the retrieved persistent time offset is not valid, returning an error to the TA indicating that the TA persistent time has been tampered with.

9. The method of claim 8, wherein said determining the validity of the retrieved persistent time offset comprises:
   retrieving a stored RTC counter value from the non-volatile memory, the RTC counter being indicative of a number of detected PR time tampering events at the time that the persistent time offset was stored in the non-volatile memory; and
   determining that the retrieved persistent time offset is valid if the retrieved RTC counter value is equal to a current RTC counter value that is indicative of a number of detected PR time tampering events at the time that the request from the TA for its persistent time was received.

10. The method of claim 1, wherein the REE corresponds to WINDOWS or a LINUX-based operating system.

11. A secure time computing device providing both a Trusted Execution Environment (TEE) and a separate Rich Execution Environment (REE), the device comprising:
   a TEE circuit including a first processor, the TEE circuit being configured to implement the TEE and to:
      maintain a real-time clock (RTC) in the TEE, the RTC providing a RTC time to the REE; and store a RTC offset and a protected reference (PR) time in non-volatile memory, the RTC offset indicating a difference between the RTC time and the PR time, wherein the RTC time and the PR time are not the same; and a REE circuit including the same or another processor, the REE circuit being configured to implement the TEE and to use RTC as its clock;

wherein the TEE circuit is further configured to:
return a current RTC time based on the TEE receiving a request from the REE to read the RTC time;
adjust the RTC time and the corresponding RTC offset by a same amount, based on the TEE receiving a request from the REE to adjust the RTC time, such that the PR time is not altered by the RTC adjustment; and
upon every use of the PR time from the TEE and every adjustment of the RTC time, storing a current PR time in the non-volatile memory.

12. The computing device of claim 11, wherein the TEE circuit is further configured to:
upon a reboot of the processor implementing the TEE:
read a current RTC time, the stored PR time, and the stored RTC offset from the non-volatile memory;
calculate a current PR time by adding the stored RTC offset to the current RTC time;
compare the current PR time to the stored PR time; and
if the current PR time is less than the stored PR time, adjust the RTC offset to equal zero, such that the RTC time and the PR time are the same.

13. The computing device of claim 12, wherein the TEE circuit is further configured to determine from the current PR time being less than the stored PR time that the PR time has been tampered with.

14. The computing device of claim 11:
wherein the non-volatile memory includes a Replay Protected Memory Block (RPMB), the RPMB being part of a larger memory unit;
wherein the RPMB supports authenticated read and write operations based on a key shared between the RPMB and the TEE, such that only the TEE is able to modify the contents of the RPMB, and such that the TEE can verify the authenticity of data read from the RPMB; and
wherein the REE circuit is configured to provide a service to the TEE circuit for sending authenticated read and write requests to the RPMB.

15. The computing device of claim 11, wherein the non-volatile memory includes an Electrically Erasable Programmable Read-Only Memory (EEPROM) unit controlled only by the TEE.

16. The computing device of claim 11:
wherein the TEE circuit and the REE circuit are implemented by a single processor utilizing ARM TRUSTZONE technology, in which a TRUSTZONE security state of the processor is propagated via buses internally within the computing device for each access to memory and peripherals including the RTC, and in which filtering of access is done in or in front of memory and peripherals belonging to the TEE based on the security state.

17. The computing device of claim 11, wherein the TEE circuit and the REE circuit are implemented by a single processor, and wherein both the REE and the TEE are implemented by the single processor as virtual machines, with the RTC being under the control of the TEE virtual machine.

18. The computing device of claim 11, wherein the TEE circuit includes a first processor, and the REE circuit includes a different second processor.

19. The computing device of claim 11, wherein the TEE circuit is further configured to:
receive, within the TEE, a request from a trusted application (TA) executing in the TEE to set a persistent time for the TA;
determine a current PR time from a current RTC time and the stored RTC offset;
determine a difference between the current PR time and the requested persistent time to be a persistent time offset for the TA; and
store the persistent time offset and a persistent time identifier for the TA in the non-volatile memory.

20. The computing device of claim 19, wherein each of a plurality of TAs is permitted to store its own persistent time offset in the non-volatile memory, and wherein the persistent time offset of each of the plurality of TAs is determined based on the same RTC offset.

21. The computing device of claim 19, wherein the TEE circuit is further configured to:
receive a request from the TA for its persistent time;
retrieve the persistent time offset for the TA from the non-volatile memory, and
determine the validity of the retrieved persistent time offset;
responsive to a determination that the retrieved persistent time offset is valid:
determine the persistent time based on the persistent time offset and a current PR time calculated from a current RTC time and the stored RTC offset; and
transmit the persistent time to the TA; and
responsive to a determination that the retrieved persistent time offset is not valid, return an error to the TA indicating that the TA persistent time has been tampered with.

22. The computing device of claim 21, wherein the TEE circuit is configured to determine the validity of the retrieved persistent time offset by being configured to:
retrieve a stored RTC counter value from the non-volatile memory, the RTC counter being indicative of a number of detected PR tampering events at the time that the persistent time offset was stored in the non-volatile memory; and
determine that the retrieved persistent time offset is valid if the retrieved RTC counter value is equal to a current RTC counter value that is indicative of a number of detected PR tampering events at the time that the request from the TA for its persistent time was received.

23. The computing device of claim 11, wherein the REE corresponds to WINDOWS or a LINUX-based operating system.

24. A method of maintaining secure time in a computing device in which one or more processors implements a Rich Execution Environment (REE), and a separate Trusted Execution Environment (TEE), the method comprising:
maintaining in the TEE, a real-time clock (RTC) that provides a RTC time to the REE;
storing a RTC offset and a protected reference (PR) time in non-volatile memory, the RTC offset indicating a difference between the RTC time and the PR time, wherein the RTC time and the PR time are not the same;
responsive to a request from the REE to read the RTC time, returning a current RTC time to the REE; and responsive to a request from the REE to adjust the RTC time, adjusting the RTC time and the corresponding RTC offset by a same amount, such that the PR time is not altered by the RTC adjustment; and upon every use of the PR time from the TEE and every adjustment of the RTC time, storing a current PR time in the non-volatile memory.

* * * * *